United States Patent [19]

Brown

[11] Patent Number: 4,604,120

[45] Date of Patent: Aug. 5, 1986

[54] METHOD AND APPARATUS FOR LUBRICATING AND MOULDING GLASS PARISONS

[75] Inventor: Roy Brown, Dronfield, England

[73] Assignee: Graphoidal Developments Limited, Dronfield, England

[21] Appl. No.: 684,920

[22] Filed: Dec. 21, 1984

[30] Foreign Application Priority Data

Dec. 23, 1983 [GB] United Kingdom ............... 8334407

[51] Int. Cl.[4] ............................................ C03B 40/02
[52] U.S. Cl. ........................................ 65/26; 65/170; 65/262
[58] Field of Search ................. 65/24, 26, 170, 262

[56] References Cited

U.S. PATENT DOCUMENTS

| | | | |
|---|---|---|---|
| 3,479,173 | 11/1969 | Bracken | 65/170 X |
| 3,580,711 | 5/1971 | Hamilton | 65/26 X |
| 3,623,856 | 11/1971 | Keller | 65/170 X |
| 3,721,542 | 3/1973 | Keller | 65/26 X |
| 3,814,594 | 6/1974 | Mumford | 65/170 X |
| 4,409,010 | 10/1983 | Brown | 65/26 |

Primary Examiner—Robert Lindsay
Attorney, Agent, or Firm—William R. Hinds

[57] ABSTRACT

Apparatus for spraying lubricant into closed moulds of a glass forming machine has the spray outlets on a carrier structure which is pivoted on the funnel arm shaft of the machine. For lubrication a pneumatic cylinder couples it to its support, fast with the funnel arm shaft so that the carrier and spray outlets are moved over the moulds. During a moulding cycle the carrier is held back inoperative by a spring so the funnels can be used normally. A method of moulding glass parisons includes selectively moving the carrier structure and spray outlets to spray lubricant at selected intervals to effect periodic lubrication cycles.

12 Claims, 7 Drawing Figures

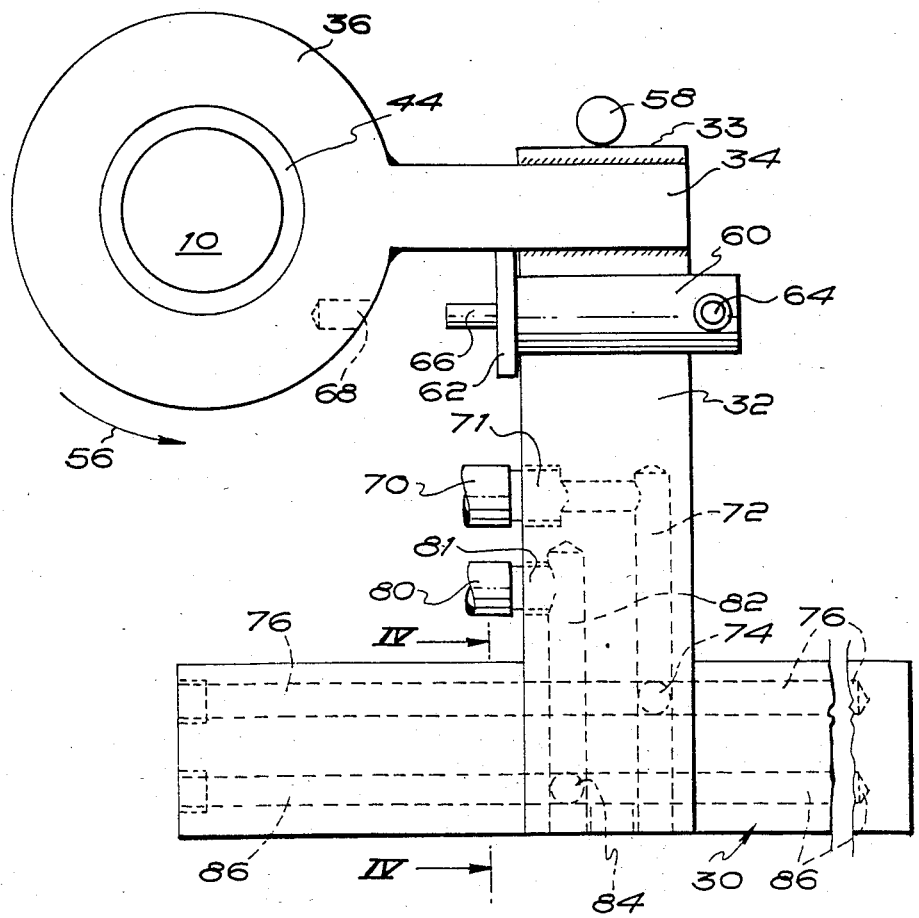
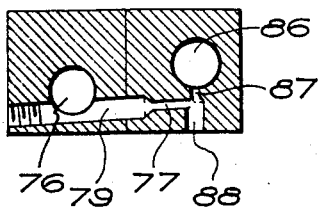
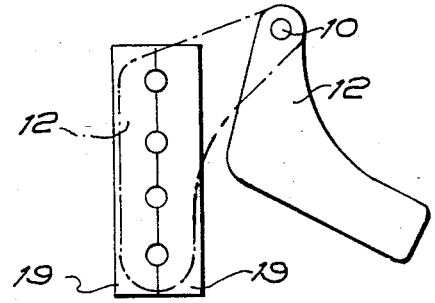

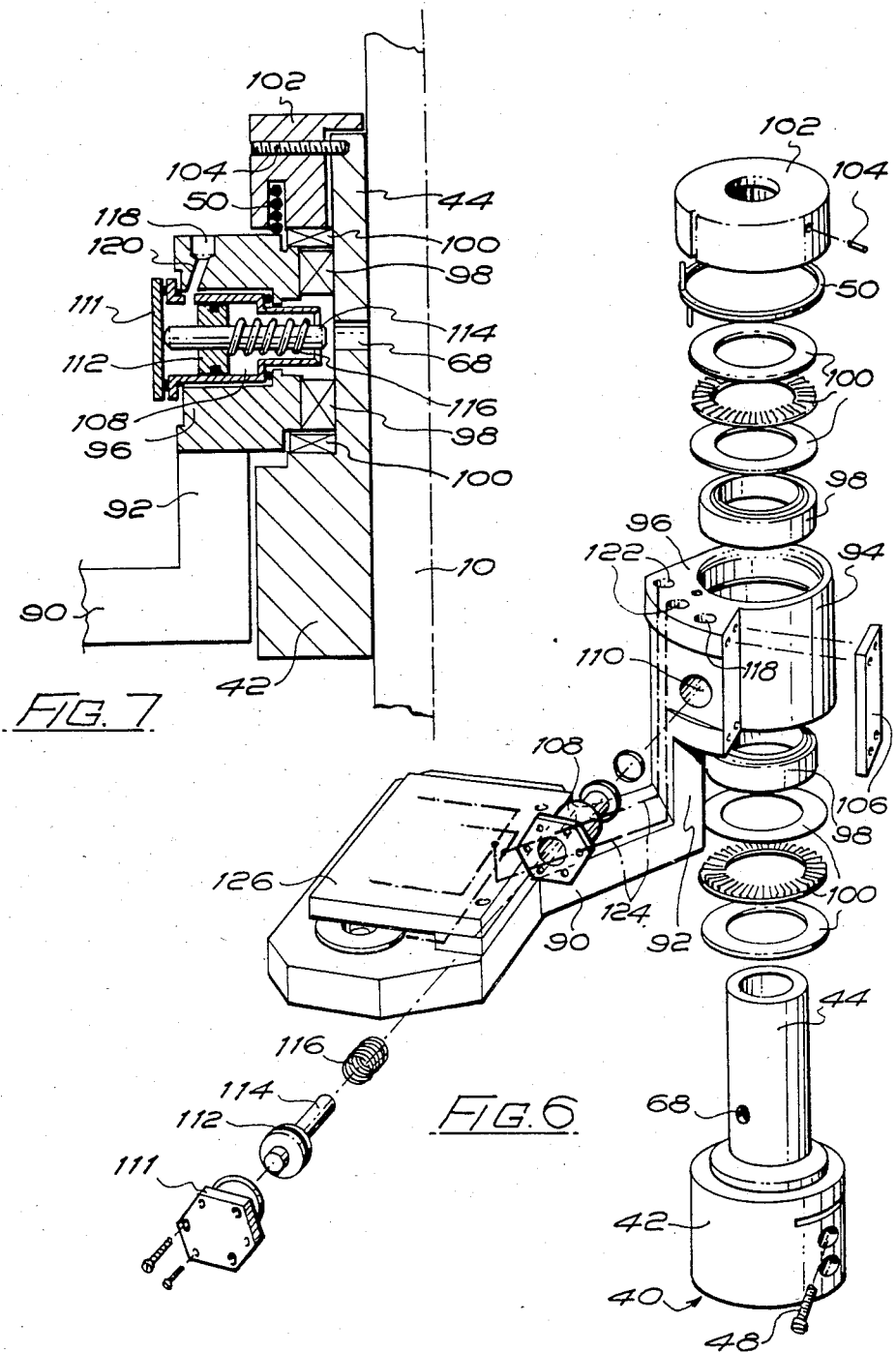

METHOD AND APPARATUS FOR LUBRICATING AND MOULDING GLASS PARISONS

FIELD AND BACKGROUND OF THE INVENTION

This invention relates to apparatus and a process for moulding parisons for glass bottles or other hollow glass ware, using automatic machinery and with provision for the periodic spraying of lubricant onto the moulds. Lubricant spray can also be applied to the neck rings.

In the conventional processes for moulding parisons, a pair of so-called "blank" moulds close together over a neck ring, a funnel is placed over the mould cavity, a gob of glass is dropped into the mould cavity through the funnel, and subsequently the funnel is removed, a baffle is put over the mould cavity to close its upper end and air is blown in at the bottom of the moulds to blow the gob out into a parison. After this the blank moulds open and the neck ring carries the parison away to the "blow" or "finish" moulds where it is blown out into the finished ware. In the "press and blow" process the gob is initially pressed out by a plunger inserted at the bottom, before it is blown out. In the "blow and blow" process the baffle is placed over the funnel and used to blow "settle air" into the mould, pressing the gob down and around a plunger at the bottom, before the gob is blown out into a parison with the funnel removed. Direct loading is a variation in which the funnel is not employed to guide the gob into the mould cavity. However, it may still be employed for blowing in settle air. Another variation is the use of a baffle with a valve in it. This can be used to blow settle air directly from the baffle into the mould instead of delivering it through a funnel, in which case the funnel may be used solely for loading the gob.

The present invention can be employed with all these forms of process.

The usual machine for carrying out these processes is the so-called IS (Independent Section) machine. This has several sections each provided with a pair of blank moulds (which may define one, two, three or more cavities). At each section there is an arm to position the funnels on top of the moulds. There is another arm to position the baffles on top of the funnels, or directly on top of the moulds.

The lubricant of the blank moulds has been performed by hand for many years. There have been numerous attempts to devise apparatus for doing this. In particular there have been various proposals to spray from above into the mould cavities defined by closed blank moulds. Any equipment for this purpose must necessarily be movable because it must not obstruct entry of the gob or removal of the parison. A glass moulding machine provides very little space for additional equipment, especially because of the need to accommodate the paths of travel of the baffle and funnel arms. A further problem is the vibration and shocks set up by the movement of heavy parts.

SUMMARY OF THE PRIOR ART

Despite the numerous prior proposals, there has until recently been no successful equipment for spraying blank moulds, and manual application remains in use. The invention described in our European Published Application No. EP-A-43261 has operated successfully on some glass forming machines and remains in use in some plants. However, this sprays open moulds and therefore only part of the discharged spray can be directed onto mould surfaces.

U.S. Pat. No. 3,141,752 issued July 1964, proposes in its FIG. 1 an arrangement in which lubricant is supplied via the funnel arm and extra passages in the funnels themselves. U.S. Pat. No. 3,721,542 issued March 1973 proposes spray nozzles mounted on the funnel arm, while a mechanism for advancing and retracting them is also carried on the funnel arm itself.

In radical contrast to prior proposals, the present invention makes use of the funnel arm's motion to transport spray nozzles into position, but without mounting them on the funnel arm itself.

According to the present invention there is provided apparatus for spraying blank moulds, comprising one or more spray outlets, a carrier structure therefor, and coupling means selectively operable to couple the carrier structure to an arm system (comprised by an arm and its operating shaft) of the glass forming machine, so as to be carried with the arm from an inoperative position to a discharge position over the closed moulds for spraying into the mould cavity or cavities, and alternatively to allow the carrier structure to remain in an inoperative position.

Preferably means are provided to mount the carrier structure pivotably on the arm's operating shaft and the said coupling means operate to couple the carrier structure to the shaft to rotate therewith, and so be carried with the arm to a position over the closed moulds.

It is convenient for the arm system employed to be the funnel arm and shaft with the inoperative position of the carrier structure and spray outlets lying over the inoperative position of the funnels. The outlets and their carrier structure may descend vertically, remaining inoperative, while the funnel arm swings the funnels down and round to their operative position in a normal moulding cycle. Then the spray outlets, their carrier structure and the funnels may move in unison more or less as one piece, when lubrication is to be performed.

A preferred coupling means is a reciprocable member movable linearly to extend into an aperture and thereby block relative motion between the carrier structure and the arm system.

The spray outlets may be various kinds of spray discharge nozzle. In particular spray nozzles as illustrated in FIGS. 11 to 14 of our European application published as EP-A-43261 may be used. Another suitable type, preferred for deep mould cavities, is as described in our European application published as EP-A-127995 (copending U.S. application Ser. No. 614,838).

In another aspect this invention provides a method of moulding glass parisons in blank moulds of a glass forming machine, which comprises providing spray outlets and a carrier structure therefor, for spraying lubricant into the top of the blank moulds while closed, together with coupling means selectively operable to couple the carrier structure to an arm system of the glass forming machine, and alternatively to allow the carrier structure to remain in an inoperative position;

repeatedly and regularly performing a moulding cycle which includes dropping a gob of molten glass into the cavity, closing the cavity, blowing in air to form the parison, opening the blank moulds and carrying away the parison; during which cycles the carrier structure and spray outlets remain in an inoperative position;

periodically performing a lubrication cycle which comprises the steps of operating the coupling means to couple the carrier structure to the arm system, thereby swinging the carrier structure and the spray outlets, with the arm to a position over the closed blank moulds, spraying lubricant into the moulds from the outlets, and returning the spray outlets and carrier structure to an inoperative position.

It is strongly preferred that the lubrication cycle is substituted for an ordinary moulding cycle, and during the lubrication cycle delivery of gob(s) to the mould cavity(ies) is prevented.

BRIEF DESCRIPTION OF THE DRAWINGS

FIG. 3 is a top plan view of the apparatus of FIG. 1;

FIG. 4 is a section passing through a spray outlet, on line IV—IV of FIG. 3;

FIG. 5 is a diagrammatic plan view showing the positions of the funnel arm relative to the closed moulds;

FIG. 6 is an exploded perspective view of a second embodiment of apparatus;

FIG. 7 is a radial section through part of the casting, and support means of FIG. 6, on the axis of the coupling piston and cylinder.

DESCRIPTION OF PREFERRED EMBODIMENTS

Figure 1:
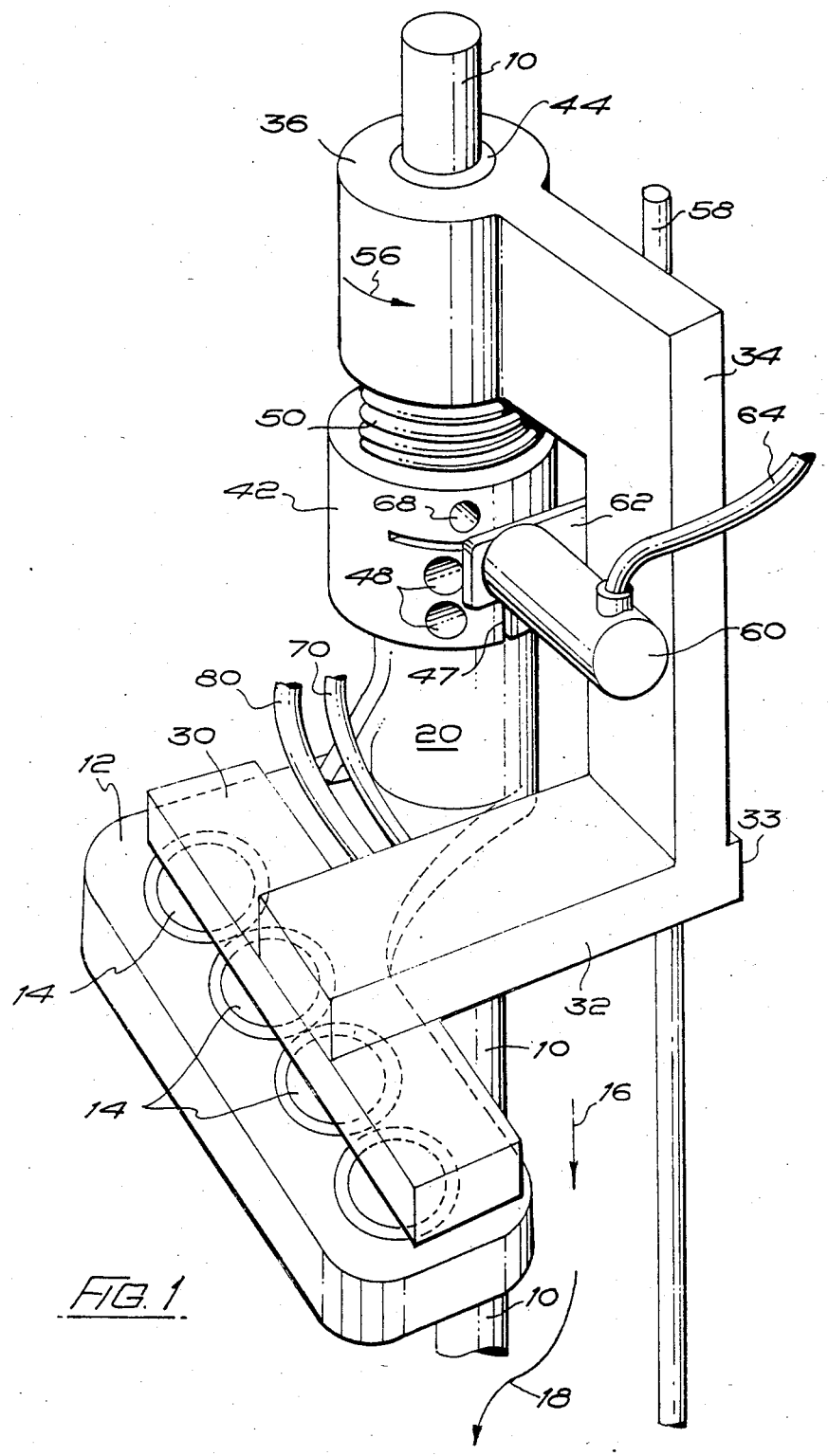
FIG. 1 is a perspective view of the funnel arm of one section of an IS machine, with part of the funnel arm's shaft, and apparatus which is a first embodiment of the invention mounted thereon.

Referring to the drawings, FIG. 1 shows the top part of the funnel arm shaft 10, the funnel arm 12, and funnels 14 of one section of a quadruple-gob IS machine, all in their rest position. When the funnels 14 are required to be swung into their operative position over the top of the blank moulds, a pneumatic cylinder located somewhat below the parts in FIG. 1 urges the shaft 10 straight down in the direction of arrow 16. However, a cam (not shown) on the lower part of the shaft 10, engaging a fixed cam track (not shown) converts the downward force into a descending swing through 55° or so followed by a straight drop onto the top of the blank moulds. This movement is represented by arrow 18. This is standard practice on an IS machine and is illustrated by FIG. 5 which shows from above the position of the closed moulds 19 and the outline of the funnel arm 12 in its operative position (chain lines) and its rest position (full lines).

The funnel arm 12 is cast integral with a collar 20 which is split, and is tightened onto the shaft 10 by clamping bolts (not shown). Fitted onto the shaft 10 above the collar 20 are parts which embody the present invention.

Four spray outlets, one for each mould cavity, are provided in a carrier structure consisting of a horizontal spray bar 30 with the outlets formed in it, a further horizontal bar 32 welded to it, an L-shaped upright 34 welded to the bar 32, and a collar 36 to which the upright 34 is welded.

The carrier structure is pivotally mounted on the shaft 10 through a support boss 40. This fits onto the top part of the shaft 10 and consists of a collar 42 integral with a sleeve 44 of lesser diameter to which it is joined through a ring 46 of intermediate diameter. The lower part of the collar 42 is split at 47 and is tightened onto the shaft 10 immediately above the collar 20 of the funnel arm, by means of clamping bolts 48. If necessary the sleeve 44 can project up beyond the top of the shaft 10.

The collar 36 is free to pivot on the sleeve 44, resting on the ring 46. A coil spring 50 encircles the ring 46; one end of it fits into a hole 52 in the collar 42, its other end 53 fits into a hole 54 in the collar 36. The spring biases the collar 36 in the direction shown by arrows 56 so that the end 33 of bar 32 bears against a fixed stop in the form of a bar 58 projecting upwardly from fixed structure below (not shown).

Coupling means is provided by a pneumatic cylinder 60 which is mounted on a bracket 62 fast with the upright 34. When this cylinder is pressurised with air entering along pipe 64 it drives a plunger 66 out, against a return spring inside the cylinder, into a bore 68 in the upper part of the collar 42. The effect of this, of course, is to couple the collar 36 rotationally to the collar 42 and hence to the shaft 10 so that all of them move as one piece as long as the cylinder 60 remains pressurised.

The construction of the spray outlets and ducts leading to them is illustrated by FIGS. 3 and 4. The lubricant is delivered via a hose 70, delivering to an inlet 71 in bar 32. This inlet 71 communicates via a horizontal bore 72, and a vertical bore 74 with a horizontal bore 76 extending within the spray bar 30. Compressed air is delivered via a hose 80 to an inlet 81 which similarly connects via bores 82, 84 with a horizontal bore 86 in the bar 30. Each outlet 88 is a narrow, downwardly open vertical bore connected via a narrower bore 87 with the bore 86. Lubricant is led into the outlet bore along a rising bore 79 which intersects the bore 76 and delivers through a constriction 77 into the outlet bore 88 where air and lubricant mix and discharge downwardly. This spray bar is closely analogous to that shown in FIGS. 11 to 14 of our European application published as EP-A-43261. The rise in the bore 79 helps to prevent undesirable leakage of lubricant when not spraying, as does the presence of constriction 77.

Lubrication is effected in a lubrication cycle which is substituted for a normal moulding cycle after a predetermined number of moulding cycles.

During a moulding cycle the cylinder 60 is never pressurised. The funnel arm 12 is carried into position over the blank moulds at the appropriate place(s) in the moulding cycle, but the spring 50 holds the carrier structure back against the stop bar 58. The carrier structure moves up and down with the funnel shaft 10, but does not rotate with it, and hence remains in an inoperative position.

When lubrication is required the cylinder 60 is pressurised before the funnel arm moves from its rest position, and it remains pressurised until it returns to the rest position. Consequently when the funnel arm is swung over the top of the moulds and down onto them, the carrier structure is carried with it, and thus the spray nozzles are positioned over the closed moulds, substantially on the axes of the mould cavities. While thus in position, pressurised air and lubricant are delivered to the inlets 71, 81 along the hoses 70, 80 causing a spray of lubricant in air to issue from all four outlets simultaneously. This spray passes through the funnels 14 into the blank mould cavities beneath.

The cylinder 60 remains pressurised until the funnel arm 12 and the spray outlets have returned to their rest position. It is then vented. The plunger 66 withdraws, and the funnel arm 12 is then free to move independently in the next moulding cycle.

The counting of moulding cycles until the predetermined number have been completed, and then the supply of pressurised lubricant and air along the hoses 70, 80, so as to cause the lubricant-in-air spray to issue from all four spray outlets, is controlled and effected by a control and supply unit of the kind described in our EP-A-43261 (the disclosure of which is incorporated herein by reference).

That unit is arranged to count the required number of moulding cycles during which lubrication of that machine section's blank moulds does not occur. Then a lubrication cycle is effected, and at the right point in this cycle, i.e. when the spray outlets are over the mould cavities, the pressurised air and lubricant are delivered to spray. The discharge of air may be continued after discharge of lubricant, to blow the latter out of the outlet bore 88.

This control and supply unit is provided with an additional solenoid operated valve and controlling circuitry, all exactly analogous to that which governs pressurisation of hose 80. This constitutes an additional "channel" which is used to pressurise the line 64 leading to the cylinder 60. However, this "channel" is adjusted differently, so as to hold the line 64 in a pressurised state for the longer period required.

During the lubrication cycle the delivery of gobs to the mould cavities is prevented and the operation of the baffle arm is prevented also. This is done by means of a signal from the control and supply unit during the lubrication cycle. This signal is connected so as to inhibit operation of the relevant pneumatic valves within the IS machine. If necessary the supply of cooling air over the blank moulds may also be stopped during a lubrication cycle, to reduce disturbance of the temperature of the blank moulds. If there are separate supplies of air to cool blank moulds, neck rings and plunger, any or all of these could be stopped (or modified) during the lubrication cycle as required.

FIGS. 6 and 7 shows a second embodiment of apparatus which is very similar in principle but has a modified and preferred construction.

The carrier structure is a single machined casting consisting of horizontal section 90 which carries spray outlet nozzles, an upright section 92 and a sleeve 94 which includes an enlarged section 96 from which the upright section 92 descends.

The support means by which the carrier structure is mounted on the funnel arm shaft is again a boss 40 consisting of a split collar 42 integral with a sleeve 44. The sleeve 94 of the casting is pivoted on the sleeve 44 by means of roller bearings 98 and thrust races 100.

A hollow cap 102 is fitted onto the top of the support boss 40 above the sleeve 94 of the casting. The cap 102 is secured to the sleeve 44 of the boss by grub screws 104 (only one is shown). The coil spring 50 is accommodated within the cap 102. The spring acts between the sleeve 94 of the casting and the cap 102 which is of course fast with the support boss 40 and hence with the funnel arm shaft 10. The coil spring biases the casting so that a wear plate 106, bolted to the casting's enlargement 96, bears against the fixed stop 58 just as with the embodiment of FIGS. 1 to 4.

Coupling means is again a pneumatic cylinder and piston, but is housed within the enlargement 96. The cylinder is an insert 108 fitted into a bore 110 in the enlargement, and sealed by O-rings. Its outer end is closed by cylinder cap 111 with an interposed O-ring seal.

The piston 112 is integral with a piston rod 114 surrounded by return spring 116. An air inlet 118 to the enlargement is connected by bore 120 (FIG. 7) with the cylinder 108 so that air pressure drives the piston 112 against the return spring 116, pushing the piston rod 114 into bore 68 in the support boss 40. This bore may be hardened, and is slidably enlarged vertically to avoid the need for alignment.

The spray outlets carried on the horizontal section 90 of the casting are not shown in detail. They are of the air-entraining type fully described in our European application published as EP-A-127995, the disclosure of which is incorporated herein by reference. Inlets for air and lubricant are provided at 122. They are connected to the spray nozzles by drilled bores within the casting (diagrammatically indicated by dotted lines 124) and in the case of lubricant, communicating bores in the plate 126, which is fastened to the casting and incorporates the lubricant outlets as described in our EP-A-127995.

Spray outlets of this latter type are preferred for driving lubricant spray well down into a deep blank mould while the FIG. 4 type are satisfactory for small to medium sized blank moulds. The horizontal part 90 of the casting could terminate in a spray bar like the bar 30 of FIGS. 1 to 4. Conversely the air-entraining type of spray outlet could be used on the embodiment of FIGS. 1 to 3.

As shown the first embodiment is for a quadruple gob machine (so-called because a pair of blank moulds define four cavities, and four gobs descend together into them). The second embodiment is for a double gob machine. However, either form of apparatus could be constructed for single, double, triple or quadruple gob machines.

Figure 2:
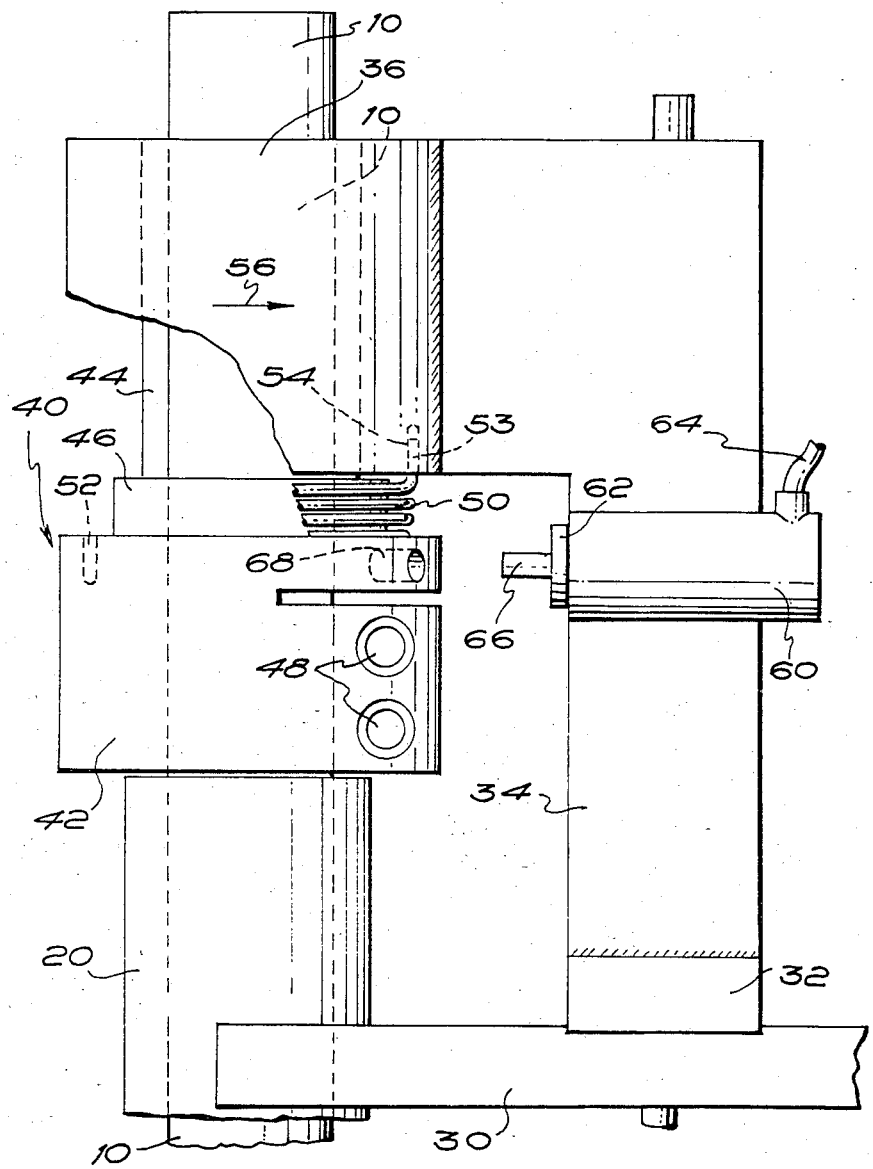
FIG. 2 is an elevational view of the apparatus of FIG. 1, partly cut away.

The second embodiment (FIGS. 6 and 7) is operated in exactly the same way as the first embodiment shown in FIGS. 1 to 3. When lubrication is required the cylinder 108 is pressurised to couple the carrier casting to the support boss. When the funnel arm is swung onto the moulds the casting is carried with it, against the bias of spring 50. This positions the spray outlets over the mould cavities, substantially on their axes. While they are so positioned, air and lubricant are delivered to the inlets 122 by the control and supply unit which is of the kind described in our EP-A-43261.

There are various possibilities for the lubrication cycle. The lubricant supply may be started before the supply of compressed air, so that some lubricant droplets fall through the mould cavity onto the neck rings or plunger, after which the spray continues as a lubricant in air spray.

There may be a lubrication cycle in which no air is delivered, at least until lubricant supply has ceased, so as to put drips of lubricant onto the neck rings and/or plunger. Contact of these drips with the hot neck rings or plunger causes vaporisation, blowing droplets of lubricant out radially.

There may be more than one type of lubrication cycle interspersed with moulding cycles. In particular a second counter could be provided in the control and supply unit, and used in a sequence where a predetermined number of moulding cycles was followed by a lubrication cycle without air (dripping onto the neck rings and plunger as mentioned above) followed by a second and possibly different predetermined number of moulding cycles, followed by a second type of lubrication cycle (which could have a spray of lubricant in air, or lubricant followed by lubricant in air) after which the sequence would repeat.

The apparatus of this invention, as described above, has a number of advantages. It enables the funnels to function normally, which can be almost essential if the gob size and blank mould size are small. It does not require an elaborate assembly of small moving parts mounted on the IS machine, where they become subject to heavy vibration. There are really only two moving parts. Both are simple and can be made robust. However, because the spraying apparatus can be selectively coupled to ride as a "passenger" on the existing structure of an IS machine, it can be accommodated within the very limited space available. The normal moulding cycle is not modified. The apparatus is a bolt-on-accessory which does not require much modification of the IS machine.

I claim:

1. Apparatus for spraying lubricant onto blank moulds of a glass forming machine of a type comprising closable blank moulds defining at least one mould cavity, and at least one arm system comprising an arm and an operating shaft fast with said arm for moving said arm to an operative position over the closed blank moulds;

said apparatus comprising:
a carrier structure with inlet means for lubricant, spray outlet means for discharging lubricant spray onto said blank moulds and duct means connecting said inlet means with said spray outlet means;
support means for supporting said carrier structure on said glass forming machine so that said carrier structure is movable between at least one inoperative position and a discharge position over the closed position of said blank moulds for spraying lubricant from said spray outlet means into said at least one mould cavity;
coupling means selectively operable to couple said carrier structure to said arm system, whereby, as said arm system moves said arm to the operative position thereof, said arm system also moves said carrier structure from said inoperative position into said discharge position for spraying lubricant; said coupling means alternatively operating to uncouple said carrier structure from said arm system whereby, as said arm system moves said arm to the operative position thereof, said arm system moves without said carrier structure, and leaves said carrier structure in a said inoperative position thereof.

2. Apparatus according to claim 1 wherein said carrier structure comprises a gas inlet, with gas duct means connecting said gas inlet to said spray outlets separately from the duct means connecting said lubricant inlet means to said spray outlets.

3. Apparatus according to claim 1 wherein said support means is means for mounting the carrier structure on said operating shaft, so as to be pivotable relative to said shaft;
said coupling means being selectively operable to couple said carrier structure to said operating shaft to rotate therewith.

4. Apparatus according to claim 3 wherein said support means comprises a collar and means for securing said collar on said operating shaft;
said carrier structure being pivotable on the collar, and said coupling means being selectively operable to couple said carrier structure to said collar.

5. Apparatus according to claim 4 wherein said coupling means comprises a reciprocable member and means for urging said member linearly to a position blocking relative movement between said carrier structure and said collar.

6. Apparatus according to claim 4 wherein said coupling means comprises a pneumatic cylinder fast with said carrier structure, a piston therein, and a rod fast with said piston, pressure in said cylinder urging said piston rod to engage an aperture in said collar.

7. Apparatus according to claim 3 comprising spring means, biassing said carrier structure into said at least one inoperative position.

8. Apparatus according to claim 1 fitted to one section of an Independent Section glass forming machine, said arm system being the funnel arm and funnel arm shaft of said section.

9. Apparatus according to claim 8 futher comprising a glass forming machine fitted with apparatus control means operative to count regularly repeated moulding cycles of the glass forming machine, and substitute a lubrication cycle after a present number of moulding cycles, said control means acting, during the lubrication cycle, to prevent delivery of molten glass to said at least one mould cavity, and also to operate said coupling means to couple said carrier structure to said arm system.

10. A method of moulding glass parisons in blank moulds of a glass forming machine of a type comprising closable blank moulds defining at least one mould cavity, and at least one arm system comprising an arm and an operating shaft fast with said arm for moving said arm to an operative position over the closed blank moulds; said method comprising fitting said machine with apparatus comprising:
a carrier structure with inlet means for lubricant, spray outlet means for discharging lubricant spray onto said blank moulds and duct means connecting said inlet means with said spray outlet means;
supporting means for supporting said carrier structure on said glass forming machine so that said carrier structure is movable between at least one inoperative position and a discharge position over the closed position of said blank moulds for spraying lubricant from said spray outlet means into said at least one mould cavity;
coupling means selectively operable to couple said carrier structure to said arm system whereby, as said arm system moves said arm to the operative position thereof, said arm system also moves said carrier structure from said inoperative position into said discharge position for spraying lubricant;
said coupling means alternatively operating to uncouple said carrier structure from said arm system whereby, as said arm system moves said arm to the operative position thereof, said arm system moves without said carrier structure, and leaves said carrier structure in a said inoperative position thereof;
repeatedly and regularly performing a moulding cycle which includes dropping a gob of molten glass into the cavity, closing the cavity, blowing in air to form the parison, opening the blank moulds and carrying away the parison; during which cycles said carrier structure is uncoupled from said arm system, and said arm system moves without said carrier structure, leaving said carrier structure in a said inoperative position thereof;

periodically performing a lubrication cycle which comprises the steps of operating said coupling means to couple said carrier structure to said arm system, operating said arm system to move said carrier structure and spray outlets with said arm to a position over the closed blank moulds, spraying lubricant into said at least one mould cavity from said spray outlets, and returning said spray outlets and carrier structure to a said inoperative position.

11. A method according to claim 10 wherein said lubrication cycle is substituted for a said moulding cycle, with no glass delivery to said at least one mould cavity during said lubrication cycle.

12. Apparatus for spraying lubricant onto blank moulds of a glass forming machine of a type comprising closable blank moulds defining at least one mould cavity, and at least one arm system comprising an arm and an operating shaft fast with said arm for moving said arm to an operative position over the closed blank moulds;

said apparatus comprising:

a carrier structure with inlet means for lubricant, spray outlet means for discharging lubricant spray onto said blank moulds and duct means connecting said inlet means with said spray outlet means;

support means mounting said carrier structure on said operating shaft to be pivotable relative thereto between an inoperative position and a discharge position over the closed position of said blank moulds for spraying lubricant from said spray outlet means into said at least one mould cavity;

coupling means selectively operable to engage said carrier structure with said arm system, for coupling said carrier structure to said arm system to be moved pivotally by said arm system from said inoperative position into said discharge position for spraying lubricant;

said coupling means alternatively disengaging said carrier structure and arm system, thereby allowing said arm system to move without said carrier structure, and to leave said carrier structure in said inoperative position during motion of said arm system.

* * * * *